US006853379B2

(12) United States Patent
Buddemeier et al.

(10) Patent No.: US 6,853,379 B2
(45) Date of Patent: Feb. 8, 2005

(54) METHOD FOR MAPPING FACIAL ANIMATION VALUES TO HEAD MESH POSITIONS

(75) Inventors: Ulrich F. Buddemeier, Venice, CA (US); Karin M. Derlich, Culver City, CA (US); Hartmut Neven, Santa Monica, CA (US)

(73) Assignee: Vidiator Enterprises Inc., Nassau (BS)

( * ) Notice: Subject to any disclaimer, the term of this patent is extended or adjusted under 35 U.S.C. 154(b) by 334 days.

(21) Appl. No.: 09/929,823

(22) Filed: Aug. 13, 2001

(65) Prior Publication Data

US 2003/0034978 A1 Feb. 20, 2003

(51) Int. Cl.[7] .............................................. G06T 13/00
(52) U.S. Cl. ...................................................... 345/473
(58) Field of Search ................................ 345/473, 474, 345/420, 4.22, 419, 44

(56) References Cited

U.S. PATENT DOCUMENTS

| | | |
|---|---|---|
| 4,725,824 A | 2/1988 | Yoshioka |
| 4,805,224 A | 2/1989 | Koezuka et al. |
| 4,827,413 A | 5/1989 | Baldwin et al. |
| 5,159,647 A | 10/1992 | Burt |
| 5,168,529 A | 12/1992 | Peregrim et al. |
| 5,187,574 A | 2/1993 | Kosemura et al. |
| 5,220,441 A | 6/1993 | Gerstenberger |
| 5,280,530 A | 1/1994 | Trew et al. |
| 5,333,165 A | 7/1994 | Sun |
| 5,383,013 A | 1/1995 | Cox |
| 5,430,809 A | 7/1995 | Tomitaka |
| 5,432,712 A | 7/1995 | Chan |
| 5,511,153 A | 4/1996 | Azarbayejani et al. |
| 5,533,177 A | 7/1996 | Wirtz et al. |
| 5,550,928 A | 8/1996 | Lu et al. |
| 5,581,625 A | 12/1996 | Connell |
| 5,588,033 A | 12/1996 | Yeung |
| 5,680,487 A | 10/1997 | Markandey |
| 5,699,449 A | 12/1997 | Javidi |
| 5,714,997 A | 2/1998 | Anderson |
| 5,715,325 A | 2/1998 | Bang et al. |
| 5,719,954 A | 2/1998 | Onda |
| 5,736,982 A | 4/1998 | Suzuki et al. |
| 5,764,803 A | 6/1998 | Jacquin et al. |
| 5,774,591 A | 6/1998 | Black et al. |
| 5,802,220 A | 9/1998 | Black et al. |
| 5,809,171 A | 9/1998 | Neff et al. |
| 5,828,769 A | 10/1998 | Burns |
| 5,917,937 A | 6/1999 | Szeliski et al. |
| 5,982,853 A | 11/1999 | Liebermann |
| 5,995,119 A | 11/1999 | Cosatto et al. |
| 6,011,562 A | 1/2000 | Gagné et al. |
| 6,044,168 A | 3/2000 | Tuceryan et al. |
| 6,052,123 A | 4/2000 | Lection et al. |
| 6,307,576 B1 * | 10/2001 | Rosenfeld ................... 345/700 |
| 6,351,269 B1 | 2/2002 | Georgiev .................... 345/629 |
| 6,504,546 B1 * | 1/2003 | Cosatto et al. .............. 345/473 |
| 6,600,491 B1 * | 7/2003 | Szeliski et al. ............. 345/473 |
| 6,611,268 B1 * | 8/2003 | Szeliski et al. ............. 345/473 |
| 6,654,018 B1 * | 11/2003 | Cosatto et al. .............. 345/473 |

FOREIGN PATENT DOCUMENTS

| | | |
|---|---|---|
| DE | 4406020 C1 | 6/1995 |
| EP | 0807902 A2 | 11/1997 |
| WO | WO99/53443 | 10/1999 |

OTHER PUBLICATIONS

International Search Report for PCT/US99/07935.
Akimoto, T., et al., "Automatic Creation of Facial 3D Models", IEEE Computer Graphics & Apps., pp. 16–22, Sep. 1993.

(List continued on next page.)

*Primary Examiner*—Don Wong
*Assistant Examiner*—Huedung X. Cao
(74) *Attorney, Agent, or Firm*—Seed IP Law Group PLLC

(57) ABSTRACT

The present invention provides a technique for translating an animation vector to a target mix vector.

19 Claims, 1 Drawing Sheet

OTHER PUBLICATIONS

Ayache, N. et al., "Rectification of Images for Binocular and Trinocular Stereovision", Proc. Of 9th Int'l., Conference on Pattern Recognition, 1, pp. 11–16, Italy, 1988.

Belhumeur, P., "A Bayesian Approach to Binocular Stereopsis", *Int'l. J. Of Computer Vision*, 19 (3), pp. 237–260, 1996.

Beymer, D. J., "Face Recognition Under Varying Pose", MIT A.I. Lab, Memo No. 1461,pp. 1–13, 12/93.

Beymer, D.J., "Face Recognition Under Varying Pose", MIT A.I. Lab. Research Report, 1994, pp. 756–761.

Buhmann, J. et al., "Distortion Invariant Object Recognition By Matching Hierarchically Labeled Graphs", In Proceedings IJCNN Int'l Conf. Of Neural Networks, Washington, D.C. Jun. 1989, pp. 155–159.

DeCarlo, D., et al., "The integration of Optical Flow and Deformable Models with Applications to Human Face Shape and Motion Estimation", pp. 1–15, In Proc. CVPR '96, pp. 231–238 (published)[TM 18.9.96].

Devernay, F. et al., "Computing Differential Properties of 3–D Shapes from Steroscopic Images without {3–D} Motels", INRIA, RR–2304, pp. 1–28, Sophia, Antipolis, 1994.

Dhond, U., "Structure from Stereo: a Review", IEEE Transactions on Systems, Man, and Cybernetics, 19(6), pp. 1489–1510, 1989.

Fleet, D.J., et al., "Computation of Component Image Velocity from Local Phase Information", *Int., J. Of Computer Vision*, 5:1, pp. 77–104 (1990).

Fleet, D.J., et al. *Measurement of Image Velocity*, Kluwer Academic Press, Boston, pp. I–203,1992.

Hall, E.L., "Computer Image Processing And Recognition", Academic Press 1979, 99. 468–484.

Hong, H.,et al., "Online Facial Recognition based on Personalized Gallery", Proceedings of Int'l Conference On Automatic Face And Gesture Recognition, pp. 1–6, Japan Apr. 1997.

Kolocsai, P., et al, Statistical Analysis of Gabor–Filter Representation, *Proceedings of International Conference on Automatic Face and Gesture Recognition*, 1997, 4 pp.

Kruger, N., "Visual Learning with a priori Constraints", *Shaker Verlag*, Aachen, Germany, 1998, pp. 1–131.

Kruger, N., et al, "Principles of Cortical Processing Applied to and Motivated by Artificial Object Recognition", Institut for Neuroinformatik, *Internal Report 97–17*, Oct. 97, pp. 1–12.

Kruger, N., et al, "Autonomous Learning of Object Representations Utilizing Self–Controlled Movements", 1998, *Proceedings of NN98*, 5 pp.

Kruger, N., et al, "Object Recognition with a Sparse and Autonomously Learned Representation Based on Banana Wavelets", *Internal Report 96–11*, Institut fur Neuroinformatik, Dec. 96, pp. 1–24.

Kruger, N., et al, "Object Recognition with Banana Wavelets", *European Symposium on Artificial Neural Networks* (E SANN97), 1997, 6 pp.

Kruger, N., "An Algorithm for the Learning of Weights in Discrimination Functions Using a priori Constraints", *IEEE Transactions on Pattern Analysis and Machine Intelligence*, vol. 19, No. 7, Jul. 1997, pp. 764–768.

Lades, M., et al, "Distortion Invarient Object Recognition in the Dynamic Link Architecture", *IEEE Transactions on Computers*, vol. 42, No. 3, 1993, 11 pp.

Luong, Q. T., et al, "The Fundamental Matrix, Theory, Algorithm, and Stability Analysis", *INRIA*, 1993, pp. 1–46.

Manjunath, B. S., et al., "A Feature Based Approach to Face Recognition", *In Proceedings IEEE Conference on Computer Vision and Pattern Recognition*, pp. 373–378, 3/92.

Mauer, T., et al, "Single–View Based Recognition of Faces Rotated in Depth", In *Proceedings of the International Workshop on Automatic Face and Gesture Recognition*, pp. 248–253, Zurich, CH, Jun. 26, 1995.

Mauer, T., et al, "Learning Feature Transformations to Recognize Faces Rotated in Depth", In *Proceedings of the International Conference on Artificial Neural Networks*, vol. 1, pp. 353–358, Paris, France, Oct. 9–13, 1995.

Mauer, T., et al, "Tracking and Learning Graphs and Pose on Image Sequences of Faces", *Proceedings of 2nd International Conference on Automatic Face and Gesture Recognition*, Oct. 14–16, 1996, pp. 176–181.

Maybank, S. J., et al, "A Theory of Self–Calibration of a Moving Camera", *International Journal of Computer Vision*, 8(2), pp. 123–151, 1992.

McKenna, S.J., et al, Tracking Facial Feature Points With Gabor Wavelets and Shape Models, (publication & date unknown), 6 pp.

Okada, K., et al, "The Bochum/USC Face Recognition System", 19 pp. (publication & date unknown).

Okutomi, M., et al, "A Multiple–Baseline Stereo", *IEEE Trans. on Pattern Analysis and Machine Intelligence*, vol. 15, No. 4, pp. 353–363, Apr. 1993.

Peters, G., et al, "Learning Object Representations by Clustering Banana Wavelet Responses", *Tech. Report IR–INI 96–09*, Institut fur Neuroinformatik, Ruhr Universitat, Bochum, 1996, 6 pp.

Phillips, P. J., et al, "The Face Recognition Technology (FERET) Program", *Proceedings of Office of National Drug Control Policy*, CTAC International Technology Symposium, Aug. 18–22, 1997, 10 pages.

Pighin, F, et al, "Synthesizing Realistic Facial Expressions from Photographs", in *SIGGRAPH 98 Conference Proceedings*, pp. 75–84, Jul. 1998.

Roy, S., et al, "A Maximum Flow Formulation of the N–Camera Stereo Corrrespondence Problem", *IEEE, Proceedings of International Conference on Computer Vision*, Bombay, India, Jan. 1998, pp. 1–6.

Sara, R. et al "3–D Data Acquision and Interpretation for Virtual Reality and Telepresence", *Proceedings IEEE Workshop Computer Vision for Virtual Reality Based Human Communication*, Bombay, Jan. 1998, 7 pp.

Sara, R. et al "Fish–Scales: Representing Fuzzy Manifolds", *Proceedings International Conference Computer Vision, ICCV '98*, pp. 811–817, Bombay, Jan. 1998.

Sara, R., et al, "On Occluding Contour Artifacts in Stereo Vision", *IEEE, Proceedings of International Conference Computer Vision and Pattern Recognition*, Puerto Rico, 1997, 6 pp.

Steffens, J., et al, "PersonSpotter—Fast and Robust System for Human Detection, Tracking, and Recognition", *Proceedings of International Conference on Automatic Face and Gesture Recognition*, 6 pp., Japan—Apr. 1998.

Theimer, W. M., et al, "Phase–Based Binocular Vergence Control and Depth Reconstruction using Active Vision", *CVGIP: Image Understanding*, vol. 60, No. 3, Nov. 1994, pp. 343–358.

Tomasi, C., et al., "Stereo Without Search", *Proceedings of European Conference on Computer Vision*, Cambridge, UK, 1996, 14 pp. (7 sheets).

Triesch, J., et al, "Robust Classification of Hand Postures Against Complex Backgrounds", *Proceedings of the Second International Conference on Automatic Face and Gesture Recognition*, Killington, VT, Oct. 1996, 6 pp.

Turk, M., et al, "Eigenfaces for Recognition", *Journal of Cognitive Neuroscience*, vol. 3, No. 1, pp. 71–86, 1991.

Wiskott, L., et al, "Face Recognition and Gender Determination", *Proceedings of International Workshop on Automatic Face and Gesture Recognition*, pp. 92–97, Zurich CH, Jun. 26, 1995.

Wiskott, L., et al., "Face Recognition by Elastic Bunch Graph Matching", *Internal Report, IR–INI 96–08*, Institut fur Neuroinformatik, Ruhr–Universitat, Bochum, pp. 1–21, Apr. 1996.

Wiskott, L., "Labeled Graphs and Dynamic Link Matching for Face Recognition and Scene Analysis", *Verlag Harr Deutsch*, Thun–Frankfurt am Main. Reihe Physik, Dec. 1995, pp. 1–109.

Wiskott, L., "Phantom Faces for Face Analysis", *Proceedings of 3rd Joint Symposium on Neural Computation*, Pasadena, CA, vol. 6, pp. 46–52, Jun. 1996.

Wiskott, L., "Phantom Faces for Face Analysis", *Internal Report, IR–INI 96–06*, Institut fur Neoroinformatik, Ruhr–Universitat, Bochum, Germany, Apr. 1996, 12 pp.

Wiskott, L. "Phantom Faces for Face Analysis", *Pattern Recognition*, vol. 30, No. 6, pp. 837–846, 1997.

Wiskott, L., et al, "Face Recognition by Elastic Bunch Graph Matching", *IEEE Transactions on Pattern Analysis and Machine Intelligence*, 19(7), pp. 775–779, 1997.

Wong, R., et al, "PC–Based Human Face Recognition System", *IEEE*, pp. 641–644, 1992.

Wurtz, R., "Object Recognition Robust Under Translations, Deformations, and Changes in Background", *IEEE Transactions on Patern Analysis and Machine Intelligence*, vol. 19, No. 7, Jul. 1997, pp. 769–775.

Wurtz, R., et al, "Corner Detection in Color Images by Multiscale Combination of End–stopped Cortical Cells", *Artificial Neural Networks—ICANN '97*, Lecture Notes in Computer Science, vol. 1327, pp. 901–906, Springer–Verlag, 1997.

Yao, Y., et al, "Tracking a Dynamic Set of Feature Points", *IEEE Transactions on Image Processing*, vol. 4, No. 10, Oct., 1995, pp. 1382–1394.

Notification of Transmittal of the International Search Report or the Declaration, International Search Report for PCT/US02/23973, mailed Nov. 18, 2002.

Valente, Stephanie et al., "A Visual Analysis/Synthesis Feedback Loop for Accurate Face Tracking", Signal Processing Image Comunication, Elsevier Science Publishers, vol. 16, No. 6, Feb. 2001, pp. 585–608.

Yang, Tzong Jer, "Face Analysis and Synthesis", Jun. 1, 1999, Retrieved from Internet, http://www.cmlab.csie,ntu.edu.tw/ on Oct. 25, 2002, 2 pg.

Yang, Tzong Jer, "VR–Face: An Operator Assisted Real–Time Face Tracking System", Communication and Multimedia Laboratory, Dept. of Computer Science and Information Engineering, National Taiwan University, Jun. 1999, pp. 1–6.

\* cited by examiner

METHOD FOR MAPPING FACIAL ANIMATION VALUES TO HEAD MESH POSITIONS

BACKGROUND OF THE INVENTION

The present invention relates to head animation, and more particularly, to generating an animated three-dimensional video head based on two-dimensional video images.

Virtual spaces filled with avatars are an attractive way to allow for the experience of a shared environment. However, animation of a photo-realistic avatar generally requires intensive graphic processes, particularly for rendering facial features.

Accordingly, there exists a significant need for improved rendering of facial features. The present invention satisfies this need.

SUMMARY OF THE INVENTION

The present invention provides a technique for translating an animation vector to a target mix vector. In the method, a calibration vector is generated and the animation vector is mapped to the target mix vector using the calibration vector.

Other features and advantages of the present invention should be apparent from the following description of the preferred embodiments taken in conjunction with the accompanying drawings, which illustrate, by way of example, the principles of the invention.

DETAILED DESCRIPTION OF THE PREFERRED EMBODIMENTS

Figure 1:
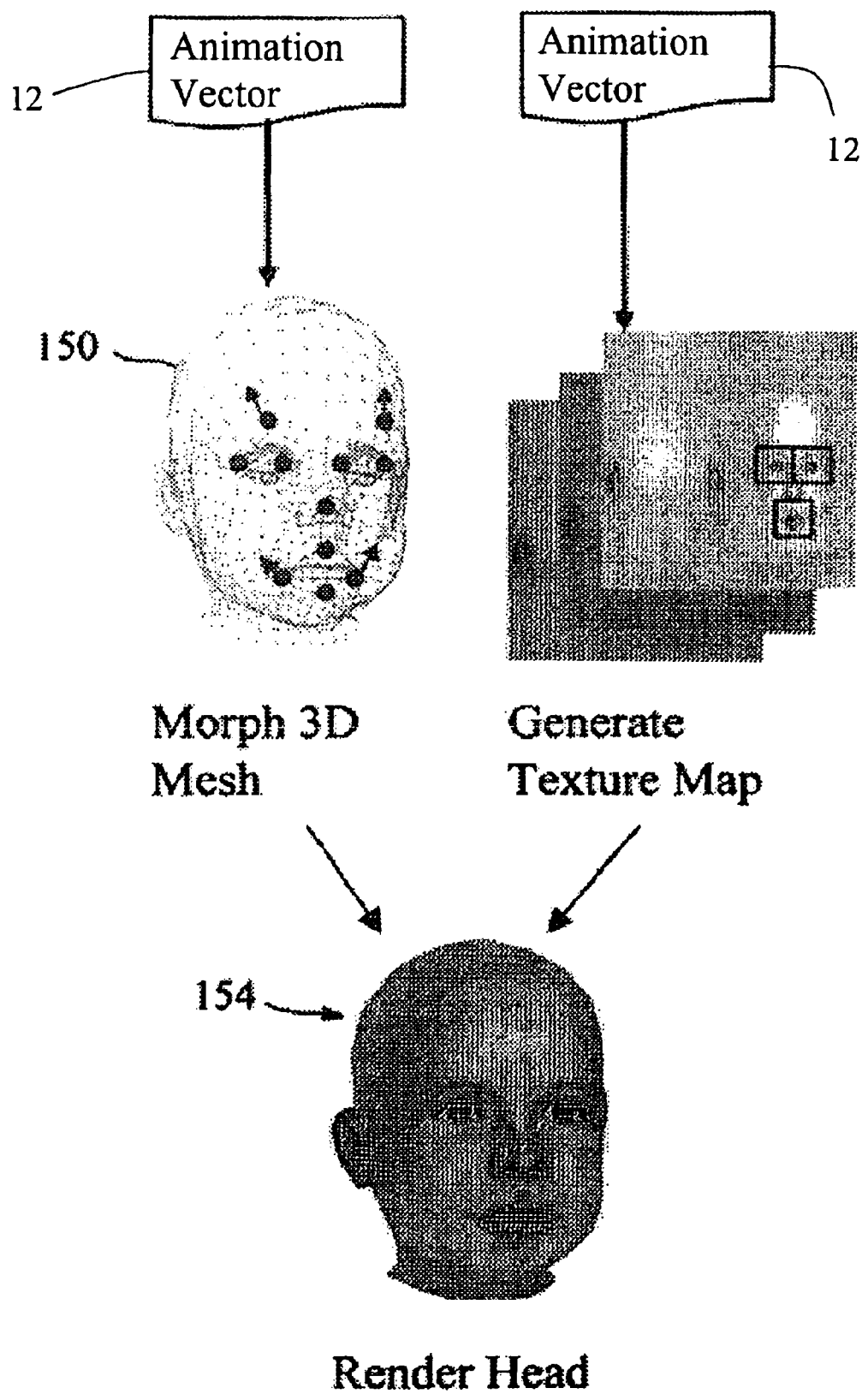
FIG. 1 is a schematic flow diagram showing a technique for translating an animation vector to a target mix vector, according with the invention.

The present invention provides a technique for translating an animation vector to a target mix vector.

With reference to FIG. 1, the animation of an avatar is defined by a set of targets. A mapping algorithm provides the translation from animation vector 12 to target mix vector.

The animation vector is the abstracted sensing result. It is the most compact representation of the facial expression as determined by audio-visual sensing.

By definition, the animation vector is zero for the neutral expression.

The target mix vector describes the contribution of each individual target to the current expression.

Different mapping algorithms may be used. Their common goal is to provide a reasonable interpolation between the points in animation space associated with the targets. Each mapping algorithm is exactly defined by a set of parameters. The parameters vary from algorithm to algorithm.

Calibration may be performed by multiplying the target mix vector with a diagonal matrix. Since the matrix is diagonal, it is henceforth referred to as the calibration vector.

An overview of the translation from animation vector to target mix vector follows. Be $\underline{a}$ the animation vector of dimension $N_a$ (number of animation values), $\underline{g}$ the target mix vector of dimension M (number of independent targets) and $p_1, \ldots, p_L$ the parameters of mapping algorithm $\underline{F}(\ )$, then $$\underline{g} = \underline{F}(\underline{a}, p_1, \ldots, p_L) \quad (1)$$

The calibrated target mix vector is obtained by multiplying with the diagonal matrix defined by the calibration vector $\underline{c}$:

$$\underline{g}_c = \begin{pmatrix} c_1 & & & \\ & c_2 & & \\ & & \ldots & \\ & & & c_M \end{pmatrix} \cdot \underline{g} \quad (2)$$

Further, be $\underline{t}_1, \ldots, \underline{t}_M$ the parameterization of the targets associated with the components of the target mix vector and $\underline{t}_0$ the parameterization of the neutral model, then the parameterization of the current expression can be obtained by a simple matrix multiplication:

$$\underline{t} = (\underline{t}_1 - \underline{t}_0 \ \underline{t}_2 - \underline{t}_0 \ \ldots \ \underline{t}_m - \underline{t}_0) \cdot \underline{g}_c + \underline{t}_0 \quad (3)$$

The matrix $(\underline{t}_1 - \underline{t}_0 \ \underline{t}_2 - \underline{t}_0 \ \ldots \ \underline{t}_M - \underline{t}_0)$ is referred to as the target matrix $\underline{\underline{T}}$.

A description of the mapping algorithm follows. Every target $\underline{t}_i$ is associated with an animation vector $\underline{a}_i$. The target and animation vectors are connected by this deliberate association only. This will become obvious in the formulas, where targets enter only as the i-th unity vector $\underline{e}_i$ representing the target mix vector that results in exactly that target. The parameterization of the target $\underline{t}_i$ is not relevant for computation of the mapping parameters. (This means that is does not matter if the target is defined by vertex positions, morph link positions or muscle tensions.)

The animation vector can be set manually or it can be derived from a reference model with targets, if the model is equipped with ground truth anchors that enable the application of the tracking algorithm to the model and it's deformations AND if the reference model implements all needed targets. The reference model must have a human geometry, since the purpose of the ground truth anchors is to simulate tracking on the model. Manual editing is necessary if the animation vector contains elements that cannot be derived from visual sensing, such as lip synch animation values.

The mapping is basically a multidimensional interpolation in $\underline{a}$ between the target points. The mapping parameters are determined by minimizing the error in reproducing the target points. Depending on the mapping algorithm, perfect reproduction of the target points may not be possible.

The parameters $p_1, \ldots, p_L$ of the mapping are determined by solving the set of equations $$\frac{\partial}{\partial p_j} \sum_{i=1}^{M} \|\underline{e}_i - \underline{F}(\underline{a}_i, p_1, \ldots, p_L)\|^2 = 0, \forall j \in [1, L] \quad (4)$$

Targets can be divided into independent groups of targets, such as eye region targets and mouth region targets. Different mapping algorithms can be applied to the different groups to achieve more flexibility.

A description of types of mapping algorithms follow. The simplest mapping algorithm is the linear mapping:

$$\underline{F}(\underline{a}, \underline{\underline{P}}) = \underline{\underline{P}} \cdot \underline{a} \quad (5)$$

The parameter matrix is determined by solving the equation $$\underline{\underline{P}} \cdot (\underline{a}_1 \ \underline{a}_2 \ \ldots \ \underline{a}_M) = \underline{\underline{1}} \quad (6)$$

using singular value decomposition. If $N_a < M$, the equation (6) is overdetermined and SVD will return the "solution"

that satisfies eq. (4). If $N_a > M$, the equation is underdetermined and the SVD solution will be the vector with the smallest norm that satisfies equation (6). SVD is described in great detail in "Numerical Recipes".

The linear method is internally referred to as the "matrix method" because of the form of the algorithm parameters.

A more general mapping is achieved by using a set of basis functions as input. Obviously, the linear method is a special case of this more general method.

$$F(\underline{a}, \underline{\underline{P}}) = \underline{\underline{P}} \cdot \underline{B}(\underline{a}) \qquad (7)$$

The solution is analog to the solution of the linear problem. Since the number of basis functions is independent of the number of animation values $N_a$, it is always possible to choose exactly M functions, so that the system is neither over- or underdetermined:

$$\underline{\underline{P}} = (\underline{B}(\underline{a}_1) \ \underline{B}(\underline{a}_2) \ldots \underline{B}(\underline{a}_M))^{-1} \qquad (8)$$

The basis functions can be chosen manually by carefully analyzing the animation vectors of the participating targets. This is the currently deployed method. The internal name is "matrix2" because it is an extension of the linear method.

The following set of basis functions and targets may be used. The basis functions are commonly referred to as "animation tag expressions".

Eye/eyebrow group basis functions (formulated in UPN)
  eyeOpen,eyeAsym,-,|-
  eyeOpen,eyeAsym,+,|-
  eyeOpen,|+
  eyeBrowRaise,eyeBrowAsym,-,|+
  eyeBrowRaise,eyeBrowAsym,+,|+
  eyeBrowRaise,|-
Eye/eyebrow group targets:
MTEyeCloseR
MTEyeCloseL
  MTEyeOpenWide
  MTBrowRaiseR
  MTBrowRaiseL
  MTBrowFurrow
  Mouth group basis functions
  lipDistance,mouthVertPos,-
  lipDistance,mouthVertPos,+,|+
  lipDistance,mouthVertPos,+,|-
  mouthwidth,|-
  mouthwidth,|+
  mouthCornerUp,|+
  mouthCornerUp,|-
  mouthHorizPos,0.5,mouthRot,*,-,|+
  mouthHorizPos,0.5,mouthRot,*,-,|-
  visemeB
  visemeF
  visemeS
  Mouth group targets:
MTMouthAh
MTMouthDisgust
  MTMouthDown
  MTMouthOh
  MTMouthEe
  MTMouthSmileOpen
  MTMouthFrown
  MTMouthPullL
  MTMouthPullR
  MTMouthB
  MTMouthF
  MTMouthS Each basis function is designed to best match to a specific target. The order in the table above represents that match. It is very tedious to design a basis function manually such that it only responds when the associated target is acted and not responds when any other target is acted. Off-diagonal elements of the P matrix lead to corrections and decouple the targets such that this desired behavior is achieved.

The target matrix, calibration matrix and mapping parameter matrix can be combined into one matrix by simple multiplication, which can be done ahead of time:

$$t = \underline{\underline{T}} \cdot \underline{g}_c + \underline{t}_0 = \underline{\underline{T}} \cdot \begin{pmatrix} c_1 & & & \\ & c_2 & & \\ & & \ldots & \\ & & & c_M \end{pmatrix} \cdot \underline{\underline{P}} \cdot \underline{B}(\underline{a}) = \underline{\underline{D}} \cdot \underline{B}(\underline{a}) + \underline{t}_0 \qquad (9)$$

$$\underline{\underline{D}} = \underline{\underline{T}} \cdot \begin{pmatrix} c_1 & & & \\ & c_2 & & \\ & & \ldots & \\ & & & c_M \end{pmatrix} \cdot \underline{\underline{P}}$$

The decoder matrix D, offset vector (neutral target) $\underline{t}_0$ and definition of basis functions $\underline{B}(\underline{a})$ are the parameters of the animation decoder used in the various players.

A description of radial/angular basis function mapping follows. The basis functions can also be a set of automatically determined functions such as radial basis functions. Certain properties of the mapping algorithm can be designed into the basis functions. A desirable property of the algorithm is scale linearity:

$$F(\lambda \underline{a}) = \lambda F(\underline{a}) \qquad (10)$$

This means that the "amplitude" of an expression is translated linearly to the model. It can be obtained by using basis functions of the form $$b_i(\underline{a}) = \frac{\|a\|}{\|a_i\|} \tilde{b}_i \left( \left\| \frac{a}{\|a\|} - \frac{a_i}{\|a_i\|} \right\| \right) \qquad (11)$$

Because of their linear or locally linear behavior, the following functions are useful for $\tilde{b}(\theta)$:

$$\tilde{b}(\theta) = \theta \qquad (12)$$

$$\tilde{b}(\vartheta) = \frac{1}{\alpha} \arctan(\alpha \vartheta) \qquad (13)$$

$$\tilde{b}(\vartheta) = \frac{\vartheta}{1 + \alpha \vartheta} \qquad (14)$$

(13) and (14) can be locally approximated by (12) and have interesting saturation characteristics. The parameter a determines the localization of these basis functions.

All mapping algorithms are somewhat arbitrary because of their nature as interpolation algorithms. The way interpolation is done between targets is determined by the choice of basis functions. It seems to be reasonable to shoot for the algorithm that delivers the most linear interpolation possible while still reproducing all targets.

If the basis functions are determined automatically, it is easily possible to add K dependent targets that are created by linear superposition of independent targets. This enables one to have more control over the interpolation process by providing additional support points. Eq. (4) is then generalized to:

$$\frac{\partial}{\partial p_j} \sum_{i=1}^{M+K} \|\underline{g}_i - \underline{F}(\underline{a}_i, p_1, \ldots, p_L)\|^2 = 0 \; \forall \; j \in [1, L]; \; \underline{g}_i = \underline{e}_i \forall \; i \leq M \quad (15)$$

Each dependent target is defined by its animation vector $\underline{a}_i$ and target mix vector $\underline{g}_i$ with i>M, which defines the superposition of independent targets. Eq. (8) has to be modified to yield the solution to this more general problem:

$$\underline{P}=(\underline{g}_1 \; \underline{g}_2 \ldots \underline{g}_{M+K}) \cdot (\underline{B}(\underline{a}_1) \; \underline{B}(\underline{a}_2) \ldots \underline{B}(\underline{a}_{M+K}))^{-1} \quad (16)$$

A description follows of code to implement the animation technique outlined before. The implementation consists of authoring and player parts. The description covers the authoring part only up to and including the container for player decoder parameters. The code can be separated into classes and functions that are directly used by applications and classes that are only used internally. Throughout the descriptions, indices to either targets or animation values are replaced by string annotations (names). This allows for a more flexible configuration. Example: Instead of referring to target 3 or animation value 5, names like "MTMouthAh" or "lipDistance" are used in the interface. The actual indices may vary from object to object. Internally the names are used to build index lookup tables to perform the various linear algebra operations efficiently.

A description of the interface follows:

aut_KeyframeData

A pure container class to store target parameterizations ($\underline{t}_i$) and ground truth data for the purpose of computing animation vectors. Contains additional annotation information, such as the meaning of certain model parameters and names of animation values.

This class serves as input for the computation of the mapping parameters and for the computation of the decoder matrix.

aut_LinTargetMapper

A facade for the computation of a linear or manual basis function mapping. Contains necessary configuration parameters to define basis functions and participating targets.

Input is an aut_KeyframeData object (ground truth data only), output is an aut_MappingResult object.

aut_MappingResult

A container class to store the mapping parameters comprised of the mapping parameter matrix $\underline{P}$, the definition of the basis functions $\underline{B}(\underline{a})$ (animation tag expressions) and the calibration vector $\underline{c}$. Contains code to compute the calibrated target mix vector $\underline{g}_c$. Additional annotation information is contained to associate target names to target mix vector components.

aut_computeAnimTagTrafo

A function to perform the multiplication of the target matrix, calibration vector and mapping parameter matrix to obtain the decoder matrix. Input to the function is an aut_KeyframeData object (to obtain the target matrix, does not need ground truth data) and an aut_MappingResult object. The output is an att_AnimTagTrafo object as described below.

att_AnimTagTrafo

A container class to hold the decoder parameters, comprised of decoder matrix, offset vector and definition of basis functions (animation tag expressions). Functions provided are: computation of the model parameterization given an arbitrary animation vector and transform of the model parameterization into a different coordinate system.

A description of internal components follows:

aut_LabeledFltMatIf and derived classes aut_LabeledFltMatIf is a pure interface to a "labeled float matrix". Each row and column of the matrix is annotated with strings to identify the data stored in the matrix. Read/write access can be done conveniently by providing names instead of indices. An actual implementation of the container is aut_LabeledFltMat, which is used to store intermediate data such as animation vectors.

aut_ExprExpLFMIf is a proxy to a aut_LabeledFltMatIf and provides the functionality to compute mathematical expressions of matrix elements. This is used to compute basis functions/animation tag expressions. Instead of supplying the name of a matrix component, an expressions is passed.

aut_MapBuilder and derived classes provide functionality to compute mapping algorithm parameters. The derived class aut_LinearMapBuilder is used in aut_LinTargetMapper. The class is configured on the fly from the parameters of aut_LinTargetMapper.

aut_Mapping and derived classes

Container classes for mapping algorithm parameters with function to compute mapping.

One aut_Mapping derived class is associated to each aut_MapBuilder derived class.

aut_LinearMapping is similar to aut_MappingResult, which is the older implementation. It is used internally in aut_LinTargetMapper. Data is then copied into an aut_MappingResult.

aut_GroundTruthCompiler

Provides functionality to compute animation vectors from ground truth data stored in an aut_KeyframeData object. The output is stored in an aut_LabeldFltMat object for use in the aut_MapBuilder classes.

A description of the process follows. A human anatomy reference model with targets is created in 3D studio Max. Ground truth anchors (spheres named GT_xx) are added to the model to mark the position of tracking nodes. The model is then exported as VRML. The VRML file can be read using the plu_VRMLoader (library PlayerUtils). Target and ground truth data is extracted using the SceneGraph functions and stored into an aut_KeyframeData. Ground truth data exists only for the first target in the VRML file. The function aut_KeyframeData:: setGTDataViaAnchorPos( ) is used to trace the vertices marked by the ground truth anchors and thus generate ground truth for all targets.

The aut_KeyframeData object is then passed to a properly configured aut_LinTargetMapper to compute the aut_MappingResult, which can be written to a file. The aut_MappingResult created in this way can be used with all models containing targets that model the same expressions, be it human or cartoonish. If decoder data is to be generated for another model, a aut_KeyframeData object has to be prepared from that model. It does not need to contain the ground truth data since this is only used to compute the aut_MappingResult. If the decoder data is generated for the reference model, the original aut_KeyframeData (see above) can be used. It is important that all model parameters that change from neutral to any target are stored in the aut_KeyframeData. This usually includes all vertex positions and the position/angles of the bottom teeth object.

The aut_KeyframeData and the aut_MappingResult are then merged into a att_AnimTagTrafo using the function aut_computeAnimTagTrafo.

The att_AnimTagTrafo contains the decoder configuration parameters that are then exported into the different content files (Pulse/Shout).

The facial animation values or tags may be displacement values relative to neutral face values. Advantageously, 8 to 22 (or more) facial animation values may be used to define and animate the mouth, eyes, eyebrows, nose, and the head angle. Representative facial animation values for the mouth may include vertical mouth position, horizontal mouth position, mouth width, lip distance, and mouth corner position (left and right).

Morphing of a texture map on a deformed three-dimensional head mesh is described in U.S. Pat. No. 6,272,231, titled WAVELET-BASED FACIAL MOTION CAPTURE FOR AVATAR ANIMATION. Imaging systems for acquiring images and image mapping are described in U.S. patent application Ser. No. 09/724,320, titled METHOD AND APPARATUS FOR RELIEF TEXTURE MAP FLIPPING. The entire disclosures of U.S. Pat. No. 6,272,231 and U.S. patent application Ser. No. 09/724,320 are incorporated herein by reference.

Although the foregoing discloses the preferred embodiments of the present invention, it is understood that those skilled in the art may make various changes to the preferred embodiments without departing from the scope of the invention. The invention is defined only the following claims.

We claim:

1. A method for translating an animation vector to a target mix vector, the method comprising:

generating a calibration vector; and mapping the animation vector to the target mix vector using the calibration vector and using an interpolation in the animation vector between target points.

2. The method of claim 1 wherein mapping the animation vector to the target mix vector using the calibration vector includes automatically performing the mapping.

3. The method of claim 1 wherein mapping the animation vector to the target mix vector using the calibration vector includes multiplying the animation vector by the calibration vector, which comprises a diagonal matrix.

4. The method of claim 1 wherein mapping the animation vector to the target mix vector includes using a linear mapping technique.

5. The method of claim 1 wherein mapping the animation vector to the target mix vector includes mapping by using a set of basis functions as input, including using radial basis function mapping.

6. The method of claim 5, further comprising:

dividing targets into independent groups of target points; and applying different mapping algorithms to different groups of target points.

7. The method of claim 1, further comprising using audio-visual sensing to track facial features for the animation vector.

8. An article of manufacture, comprising:

a machine-readable medium having instructions stored thereon to cause a processor to translate an animation vector to a target mix vector, by:

generating a calibration vector; and automatically mapping the animation vector to the target mix vector using the calibration vector and using an interpolation in the animation vector between target points.

9. An article of manufacture, comprising:

a machine-readable medium having instructions stored thereon to cause a processor to translate an animation vector to a target mix vector, by:

generating a calibration vector; and automatically mapping the animation vector to the target mix vector using the calibration vector by multiplying the animation vector by the calibration vector, which comprises a diagonal matrix.

10. An article of manufacture, comprising:

a machine-readable medium having instructions stored thereon to cause a processor to translate an animation vector to a target mix vector, by:

generating a calibration vector; and automatically mapping the animation vector to the target mix vector using the calibration vector by mapping using a set of basis functions as input.

11. The article of manufacture of claim 10 wherein the instructions to map using the set of basis functions as input includes instructions to use linear mapping.

12. The article of manufacture of claim 10 wherein the instructions to map using the set of basis function as input includes instructions to use radial basis function mapping.

13. A system for translating an animation vector to a target mix vector, the system comprising:

a means for generating a calibration vector; and a means for automatically mapping the animation vector to the target mix vector using the calibration vector and using an interpolation in the animation vector between target points.

14. The system of claim 13 wherein the means for automatically mapping the animation vector to the target mix vector using the calibration vector includes a means multiplying the animation vector by the calibration vector.

15. The system of claim 13, further comprising a means for visually sensing to track facial features for the animation vector.

16. The system of claim 13 wherein the means for mapping the animation vector to the target mix vector includes a means for mapping by using a set of basis functions as input.

17. The system of claim 16 wherein the means for mapping by using the set of basis functions as input includes a means for mapping using a radial basis function.

18. The system of claim 13 wherein the means for mapping the animation vector to the target mix vector includes a means for mapping using a linear mapping technique.

19. The system of claim 13, further comprising additional means for cooperating with the animation vector, calibration vector, and target mix vector to animate a head image.

* * * * *